United States Patent
Wenzel et al.

(10) Patent No.: US 11,338,158 B2
(45) Date of Patent: May 24, 2022

(54) SYSTEM AND A METHOD FOR DELIVERING BREATHING GAS TO PASSENGERS ON-BOARD AN AIRCRAFT

(71) Applicant: Safran Aerotechnics, Plaisir (FR)

(72) Inventors: Jürgen Wenzel, Cologne (DE); Wolfgang Rittner, Ahrensboek (DE); Jean-Baptiste Philippe Delprat, Chaville (FR); Vincent Jean Pierre Marie Gillotin, Vauhallan (FR); Vincent Gérard Greter, Elancourt (FR); Florian Damien Romain Klockiewicz, Elancourt (FR); Joan Urbain, Chavenay (FR); Stuart David Dixon Walker, Paris (FR)

(73) Assignee: SAFRAN AEROTECHNICS SAS, Plaisir (FR)

( * ) Notice: Subject to any disclaimer, the term of this patent is extended or adjusted under 35 U.S.C. 154(b) by 666 days.

(21) Appl. No.: 16/352,947

(22) Filed: Mar. 14, 2019

(65) Prior Publication Data

US 2019/0282839 A1    Sep. 19, 2019

Related U.S. Application Data

(60) Provisional application No. 62/643,489, filed on Mar. 15, 2018.

(51) Int. Cl.
*A62B 7/02* (2006.01)
*A62B 7/14* (2006.01)
(Continued)

(52) U.S. Cl.
CPC .................. *A62B 7/14* (2013.01); *A62B 7/02* (2013.01); *A62B 18/02* (2013.01); *A62B 9/02* (2013.01);
(Continued)

(58) Field of Classification Search
CPC ............. A62B 7/14; A62B 7/02; A62B 18/02; A62B 9/02; B64D 13/02; B64D 2231/02; B64D 2231/025
See application file for complete search history.

(56) References Cited

U.S. PATENT DOCUMENTS

| 2,248,349 | A | * | 7/1941 | Heidbrink | ................ | A62B 7/14 |
| | | | | | | 128/205.17 |
| 4,098,271 | A | * | 7/1978 | Maddock | ................ | A62B 9/00 |
| | | | | | | 128/202.22 |

(Continued)

FOREIGN PATENT DOCUMENTS

| CN | 102451527 A | 5/2012 |
| CN | 106550594 A | 3/2017 |

(Continued)

OTHER PUBLICATIONS

Europe Patent Application No. 19305311.3, Extended European Search Report, dated Aug. 21, 2019.

(Continued)

*Primary Examiner* — Tu A Vo
(74) *Attorney, Agent, or Firm* — Kilpatrick Townsend & Stockton LLP (57) ABSTRACT

A system for delivering breathing gas to passengers on-board an aircraft, including:
  a source of breathing gas,
  at least one face mask for passengers,
  a reservoir associated with each face mask,
  a delivery valve for each face mask, the delivery valve being disposed between the source of breathing gas and the reservoir, the reservoir being disposed between the delivery valve and the face mask,
  a sensor associated with each reservoir and configured to sense a filling of the reservoir, and (Continued)

a controller configured to control the delivery valve in a continuous supply mode to provide a continuous flow of breathing gas to the reservoir and to interrupt the continuous flow of breathing gas when the filing sensed by the sensor is a filling threshold.

35 Claims, 4 Drawing Sheets

(51) Int. Cl.
    *A62B 18/02*     (2006.01)
    *A62B 9/02*     (2006.01)
    *B64D 13/02*     (2006.01)

(52) U.S. Cl.
    CPC .......... *B64D 13/02* (2013.01); *B64D 2231/02* (2013.01); *B64D 2231/025* (2013.01)

(56) References Cited

U.S. PATENT DOCUMENTS

| | | | |
|---|---|---|---|
| 5,265,597 A * | 11/1993 | Wallis | A62B 18/025 128/205.17 |
| 5,299,579 A * | 4/1994 | Gedeon | A61B 5/083 600/532 |
| 5,343,859 A * | 9/1994 | Kikut | A62B 7/14 128/205.13 |
| 5,408,995 A * | 4/1995 | Contino | A62B 7/14 128/205.17 |
| 5,509,406 A * | 4/1996 | Kock | A61M 16/104 128/200.24 |
| 5,537,995 A * | 7/1996 | Ottestad | A62B 7/10 128/204.26 |
| 5,678,540 A * | 10/1997 | Kock | A61M 16/00 128/205.13 |
| 6,213,120 B1 * | 4/2001 | Block | A61M 16/0075 128/204.21 |
| 6,305,401 B1 | 10/2001 | Uehara et al. | |
| 7,055,520 B2 * | 6/2006 | Swisa | A61B 5/087 128/200.24 |
| 7,481,216 B1 | 1/2009 | Degenhardt et al. | |
| 7,578,293 B2 * | 8/2009 | Matthiessen | A62B 7/04 128/205.17 |
| 7,588,032 B2 * | 9/2009 | Cannon | A62B 7/14 128/203.25 |
| 7,784,463 B2 | 8/2010 | Cannon | |
| 7,793,680 B2 | 9/2010 | Frampton | |
| 8,474,456 B2 * | 7/2013 | Rittner | A62B 7/14 128/204.26 |
| 8,517,018 B2 | 8/2013 | Wenzel et al. | |
| 8,733,352 B2 | 5/2014 | Bailey et al. | |
| 9,272,786 B2 | 3/2016 | Cazenave et al. | |
| 2003/0101997 A1 * | 6/2003 | Farin | A62B 7/14 128/205.17 |
| 2006/0118115 A1 * | 6/2006 | Cannon | A62B 7/14 128/204.26 |
| 2007/0062531 A1 * | 3/2007 | Fisher | A61B 5/083 128/204.23 |
| 2007/0163592 A1 * | 7/2007 | Reinstadtler | A61M 16/06 128/205.27 |
| 2009/0014003 A1 * | 1/2009 | Degenhardt | B64D 11/00 128/205.23 |
| 2009/0173348 A1 * | 7/2009 | Fisher | A61M 16/0045 128/205.12 |
| 2009/0260631 A1 | 10/2009 | Aubonnet et al. | |
| 2009/0277449 A1 | 11/2009 | Bloch et al. | |
| 2010/0139658 A1 * | 6/2010 | Wenzel | B64D 10/00 128/204.22 |
| 2013/0340760 A1 | 12/2013 | Brumley et al. | |
| 2016/0287833 A1 * | 10/2016 | Cewers | A61M 16/1075 |

FOREIGN PATENT DOCUMENTS

| | | | | |
|---|---|---|---|---|
| EP | 2446930 A1 | 5/2012 | | |
| GB | 2426204 A | * 11/2006 | | A62B 7/02 |
| WO | 2008138930 A2 | 11/2008 | | |
| WO | 2015197542 A1 | 12/2015 | | |

OTHER PUBLICATIONS

China Patent Application No. 201910198492.2, Office Action and Search Report, dated Jul. 2, 2021.
Chinese Application No. 201910198492.2, Office Action dated Dec. 3, 2021, 13 pages (6 pages of Original Document and 7 pages of English Translation).
Qiu et al., Advanced Course of Intensive Care Medicine, People's Military Medical Publishing House, Aug. 31, 2014, p. 23 (2 pages of Original Document and 3 pages of English Translation).

\* cited by examiner

SYSTEM AND A METHOD FOR DELIVERING BREATHING GAS TO PASSENGERS ON-BOARD AN AIRCRAFT

CROSS REFERENCE TO RELATED APPLICATIONS

This application claims the benefit of and priority to U.S. Provisional Patent Application Ser. No. 62/643,489, filed on Mar. 15, 2018, the entire contents of which application are hereby incorporated herein by this reference.

FIELD OF THE INVENTION

This invention relates to systems and methods for supplying oxygen (or breathing gas with high rate of oxygen) to passengers and more particularly, although not necessarily exclusively, to equipment and techniques for determining, either generally or specifically, quantities of oxygen (or breathing gas with high rate of oxygen) present in reservoirs or buffers associated with passenger face masks of the systems.

BACKGROUND OF THE INVENTION

During cruise portions of flight, most commercial passenger aircraft operate at altitudes exceeding fourteen thousand feet. At these altitudes, insufficient oxygen may be present in the ambient air to sustain human consciousness or life. Accordingly, cabins of the aircraft are pressurized, often to altitudes equating approximately eight thousand feet. At such "cabin altitudes," sufficient oxygen normally will be present in ambient air to avoid hypoxia and thereby sustain human consciousness and life.

Loss of cabin pressurization when an aircraft is flying above, e.g., fourteen thousand feet, therefore, creates risk of passengers (and crew) experiencing hypoxia. Aircraft hence typically are fitted with emergency (auxiliary or complementary) oxygen systems configured to supply complementary oxygen to passengers temporarily while an aircraft operator reduces the flight altitude of the aircraft. The systems include cup-shaped face masks connected to sources of oxygen via flexible tubing. Also frequently attached to the each face mask is an inflatable reservoir bag made of lightweight, flexible plastic, which may accumulate gas for subsequent breathing by the passenger having donned the mask.

The emergency oxygen systems generally supply the passengers with breathing gas either on demand or with a continuous (constant) flow.

U.S. Pat. No. 7,784,463 to Cannon describes an emergency oxygen system for use on-board aircraft. Illustrated in FIG. 1 of the Cannon patent is a passenger wearing a face mask, from whose back an elongated reservoir bag protrudes. The reservoir bag "is in fluid communication with a supply conduit" via a delivery valve (or delivery valve) so as to allow oxygen to accumulate in the bag, with the delivery valve being controlled in response to passenger exhalation signals being received from a pressure sensor fitted to the face mask. Upon the passenger depleting the contents of the reservoir bag, ambient cabin air is drawn into the mask for the passenger to breathe. See Cannon, col. 5, 11. 1-17.

Consistent with conventional on-demand systems such as that of the Cannon patent, the reservoir is supplied with pulse dosed oxygen. The pulse is triggered by the sensing of the passenger breath. The dose (quantity) is based on the aircraft altitude. One disadvantage of the conventional on-demand systems is the difficulty to reliably detect the breath activity of the passenger, for instance due to leaks between the mask and the passenger face or when the passenger breath is low (for instance when the passenger is a child).

The convention continuous-flow systems, as for instance disclosed in U.S. Pat. No. 7,793,680 to Frampton, are quite simple and not expensive, but they do not enable variations amongst the flow of oxygen provided to the passengers. It induces oxygen losses in order to provide a sufficient flow to the passengers who require a high flow.

The aim of the invention is to provide to each passenger a more adequate amount of oxygen which means providing a higher amount of oxygen when required by the passengers while reducing the oxygen consumption, or at least not substantially increasing the oxygen consumption.

SUMMARY OF THE INVENTION

According to an aspect of the invention, the system comprises:
 a source of breathing gas,
 a (at least one) face mask (for passengers),
 a reservoir (or buffer) associated with each face mask,
 a delivery valve for each face mask, the delivery valve being disposed between the source of breathing gas and the reservoir, the reservoir being disposed between the delivery valve and the face mask,
 a sensor associated with each reservoir and configured to sense a filling (the filing is preferably a volume, but it may be a weight, of oxygen accumulated available for breathing by the passenger) of the reservoir, and
 a controller configured to control the delivery valve in a continuous supply mode to provide a continuous flow of breathing gas to the reservoir and to interrupt the continuous flow of breathing gas when the filling sensed by the sensor is a filling threshold.

The expression "continuous flow" should be understood as being usually continuous, in contrast to the pulse dosed breathing gas provided one time per demand (inhalation) of the user (passenger). It derives from this "continuous flow" that the quantity accumulated in the reservoir depends on the time during which the breathing gas accumulates.

Therefore, if the passenger is normally donning the mask normally (in the expected time), the passenger breathes an average volume per minute and stays an average time period without inhaling, then the continuous flow of breathing gas accumulates in the reservoir until the passenger inhales and the passenger inhales before the filling of the reservoir reaches the filling threshold. The passenger first breathes the breathing gas accumulated in the reservoir. Then, when the reservoir is empty, the passenger breathes ambient air. Therefore, the passenger is supplied with a sufficient amount of oxygen in order to avoid hypoxia.

Conversely, if a passenger stay more than the average time period without inhaling (because the passenger took more time than expected to don the mask, or the passenger stays longer the average time period without inhaling because the passenger removed the mask, or the like), the passenger blood desaturates in oxygen (it may be highly desaturated). But, according to the invention, the continuous flow of breathing gas keeps on accumulating until reaching the filling threshold. Therefore, the quantity of breathing gas of this passenger is more filled than the average. So, if the reservoirs are appropriately sized, when filled they may be able to provide sufficient oxygen to re-saturate blood of even deeply-desaturated passengers. As the passengers inhale through their face masks and drain oxygen from the reservoirs, the continuous flow resumes (or continues if the quantity of breathing gas in the reservoir did not reach the filling threshold) when the passengers inhale to allow the reservoirs to refill. This cycle may continue throughout the depressurization situation, continuous flow being controlled in response to an assessment of whether or not its associated reservoir is at the filling threshold.

Moreover, it is avoided that breathing gas spreads within the aircraft cabin when a passenger stop inhaling the breathing gas in the mask (for instance, because the passenger took another mask) as the continuous flow is interrupted, in case the passenger does not inhale before the reservoir is full. So, it helps reduce the quantity of emergency oxygen that otherwise would be wasted into the cabin because of the full reservoirs. And, in case of fire, as the breathing gas is interrupted before leaking, the fire is not promoted by the breathing gas leaking as the reservoir is full.

So, the oxygen is only supplied when needed and the system can accommodate demand peaks in the inhalation profile of the passenger.

This is particularly important since the peak is usually at the beginning of the inhalation, where the gas does to the deepest.

According to another feature in accordance with the invention, preferably the continuous supply mode is a first continuous supply mode, and the controller is configured to adjust the flow of breathing gas in a second continuous supply mode higher than in the first continuous supply mode.

Therefore, the passengers can be better protected in the second continuous supply mode, for instance because the passengers need to breath less ambient air (presence of toxic gas or fumes) or to breath more oxygen (high risk of hypoxia).

According to a complementary feature, the controller is preferably configured to switch between the first continuous supply mode and the second continuous supply mode based on a second parameter, the second parameter including presence of toxic gas and/or fumes in ambient gas.

According to a complementary feature, the controller is preferably configured to adjust the flow of breathing gas in the first continuous supply mode between a low flow and a high flow, and the controller is configured to adjust the flow of breathing gas in the second continuous supply mode higher or equal to the high flow.

Therefore, the passengers are supplied with sufficient breathing gas, to avoid breathing ambient air.

According to a complementary feature, the controller is preferably configured to set the flow of breathing gas at a predetermined (maximum) flow in the second continuous supply mode.

As the predetermined flow is configured to supply the passenger with sufficient breathing gas in order to breathe only breathing gas (not ambient air), the flow has not to change in the second continuous supply mode.

According to a complementary feature, preferably the delivery valve is of on/off type and the controller is configured to control the delivery valve in Pulse Modulation mode (PWM or the like) in the first continuous supply mode, and the controller is configured to maintain the delivery valve open in the second continuous supply mode.

Therefore, the flow in the second continuous supply mode is easily set. In the first continuous supply mode, as it is well known, as the time period of a repeated phase comprising a period during which the valve is open and a phase during which the valve is closed is very short, the flow is considered as continuous. The phase during which the delivery valve is closed enables to adjust the flow of breathing to the desired level, but the flow is however continuous.

According to another feature in accordance with the invention, preferably the source of breathing gas is provided in a deactivated state and the system is configured to automatically activate the source of breathing gas in case of depressurisation.

According to an alternative feature in accordance with the invention, preferably the system further comprises a regulator configured to be controlled by the controller to adjust the flow of breathing gas in the first continuous supply mode and in the second continuous supply mode.

Therefore, the more the passenger spends time before donning the more breathing gas is supplied to the passenger. So, the blood of the passenger is shorter desaturated.

According to still another feature in accordance with the invention, preferably the filling threshold is a first filling threshold, the sensor is configured to sense the filing of the reservoir at a second filling threshold lower than the first filling threshold, and the controller is configured to resume the continuous flow when the filing sensed by the sensor is the second filling threshold (in the reservoir).

Therefore, breathing gas is automatically supplied to the reservoir when the passenger drains oxygen from the reservoir by inhaling breathing gas through the face mask.

According to a complementary feature in accordance with the invention, the second filling threshold is at least 3% below the first filling threshold.

Thus, hysteresis is created to prevent nuisance (small, frequent) due to signal noise (inaccuracy of measurement), small leaks or the like.

According to another feature in accordance with the invention, the controller is preferably configured to adjust the flow of breathing gas at several non-null values in the continuous supply mode based on at least one first parameter.

Therefore, in the continuous supply mode, the flow is adjusted to reduce the consumption of breathing gas as much as possible while avoiding the risk of hypoxia of the passenger. Ideally, the flow would match the flow that is required by the regulatory minimum flow rate.

According to a complementary feature in accordance with the invention, preferably the at least first parameter is selected from the group consisting of cabin altitude, aircraft altitude, composition of exhalation gas, breathing frequency and blood oxygen saturation.

According to another feature in accordance with the invention, the sensor is preferably configured to send a binary signal based on the filling threshold of the reservoir.

Thus, the system is simple and less efficient as the sensor as just to sense one filling value of the reservoir.

According to an alternative feature in accordance with the invention, the sensor is preferably configured to sense at least two different values of reservoir filling (oxygen accumulated in the associated reservoir).

Therefore, further information may be determined, such as the quantity of breathing gas in the reservoir at more moments, inhalation speed which is clue for determining hyperventilation, state of consciousness or if the passenger is normally breathing through the mask. This information is useful to the crew, in particular to determine whether medical intervention (help) is required.

According to a supplementary feature in accordance with the invention, preferably the sensor is configured to sense at least two different values of reservoir filling, and the controller is configured to determine at least first parameter based on the values of reservoir filling of the reservoir sensed by the sensor.

According to another feature in accordance with the invention, the filling threshold is preferably fullness of the reservoir.

Therefore, the breathing can be accumulated until complete filling of the reservoir.

According to another feature in accordance with the invention, the reservoir is preferably a reservoir bag of bellows-type.

Therefore, the extension of the reservoir is roughly linearly proportional to the volume of breathing gas within the reservoir.

According to a complementary feature in accordance with the invention, preferably the reservoir extends between a first longitudinal end and a second longitudinal end, and the reservoir comprises several annular pleats between the first longitudinal end and the second longitudinal end.

Therefore, the reservoir has a very low length when it is empty and it can contain a quite high quantity of breathing gas.

According to an even complementary feature in accordance with the invention, preferably the reservoir is connected to the face mask through the first longitudinal end, and the reservoir comprises a backing plate at the second longitudinal end.

According to another complementary feature in accordance with the invention, preferably the sensor comprises a switch and a lanyard, and the lanyard has a first lanyard end fixed to the first longitudinal end of the reservoir and a second lanyard end connected to the second longitudinal end of the reservoir through the switch.

According to an alternative feature in accordance with the invention, preferably the reservoir comprises a flexible reservoir bag, and the sensor comprises a strain gauge fixed on the reservoir.

According to another alternative feature in accordance with the invention, preferably the face mask comprises an inlet valve between the reservoir and a breathing cavity of the face mask, the inlet valve being of check valve type.

Yet, according to another feature in accordance with the invention, preferably the face mask comprises an inlet valve between the reservoir and a breathing cavity of the face mask, the inlet valve being of check valve type, the inlet valve is configured to progressively move from a closed position to an open position during the filling of the reservoir, and the inlet valve stay closed (the inlet valve prevent communication between the reservoir and the breathing cavity) between the closed position and an intermediate position, and the sensor is configured to detect the intermediate position.

According to another feature in accordance with the invention, preferably the system comprises a RFID module connected to the sensor, the RFID module is configured to power and read the sensor, and the RFID module is configured to communicate with the controller.

According to another feature in accordance with the invention, preferably the system comprises:
 a plurality of face masks,
 a plurality of reservoirs, each reservoir being associated with one of the plurality of face masks,
 a plurality of sensors, each sensor being associated with each reservoir and configured to sense a filling threshold in the associated reservoir, and
 the controller is configured to control the continuous flow of breathing gas from the source to each reservoir and to interrupt the continuous flow of breathing gas to the reservoir whose associated sensor senses the filling threshold in the reservoir.

More generally, the present invention seeks to provide systems and methods in which amounts of gas accumulated in reservoirs or buffers associated with passenger face masks are known either generally specifically. In some embodiments of the invention, suitable sensors assess whether the reservoirs are full of oxygen at a given time. If so, a controller of the system signals closure of associated delivery valves, precluding further oxygen being supplied to the full reservoirs at that time. Closing the delivery valve valves when reservoirs are full helps reduce the quantity of emergency oxygen that otherwise would be wasted into the cabin because of the full reservoirs.

By contrast, if at the given time certain reservoirs are not full, the controller opens the associated delivery valves in order to furnish additional oxygen to the reservoirs for purposes of filling them. If the reservoirs are appropriately sized, when filled they may be able to provide sufficient oxygen to re-saturate blood of even deeply-desaturated passengers. As the passengers inhale through their face masks and drain oxygen from the reservoirs, the associated delivery valves reopen to allow the reservoirs to refill. This cycle may continue throughout the emergency, with the state of each delivery valve being controlled in response to an assessment of whether or not its associated reservoir is, or is not, full of oxygen.

When a delivery valve is open, oxygen may flow to a reservoir at any suitable rate. One such flow rate may be determined as functions of the altitude of the aircraft and of its rate of descent. If additional breathing characteristics of a particular passenger are known, an oxygen flow rate may be tailored for the passenger or for a group of passengers including the passenger. Indeed, to the extent the volume of oxygen in a reservoir is known more precisely, characteristics such as breathing rate and inhalation speed of the passenger, for example, may be determined. These characteristics may imply other information about the passenger, including whether he or she is hyperventilating or unconscious, which could be useful to crew of the aircraft or to the emergency oxygen system itself to evaluate whether further intervention is needed.

It thus is an optional, non-exclusive object of the present invention to provide systems for delivering oxygen to passengers on-board aircraft.

It is an additional optional, non-exclusive object of the present invention to provide oxygen-delivery systems configured to sense fullness status of reservoirs of the systems.

It is another optional, non-exclusive object of the present invention to provide oxygen-delivery systems in which reservoirs include sensors adapted to sense whether the reservoirs are, or are not, full of oxygen.

It is a further optional, non-exclusive object of the present invention to provide oxygen-delivery systems in which the fullness status of a reservoir is used to control opening and closing of an associated delivery valve.

It is, moreover, an optional, non-exclusive object of the present invention to provide oxygen-delivery systems in which sufficient oxygen is accumulated in reservoirs to meet the breathing needs of passengers whose blood is deeply desaturated or who are experiencing smoky ambient cabin air itself unsuitable for breathing.

According to another aspect, the invention relates to a method for supplying delivering breathing gas to passengers on-board an aircraft. According to the invention, the method comprises:

supplying a reservoir associated with a face mask with a continuous flow of breathing gas, the reservoir being associated with a face mask, sensing filling of the reservoir, interrupting the continuous flow of breathing gas when a filling threshold is reached.

In advantageous embodiments, the method preferably further has one or more of the following features:

the filling threshold is a first filling threshold and the method comprises resuming the continuous flow when the reservoir filling decreases to a second filling threshold;

the second filling threshold is at least 3% below the first filling threshold.

the first filling threshold is fullness of the reservoir;

adjusting the flow of breathing gas at several non-null values in the continuous supply mode based on at least one parameter selected from the group consisting of cabin altitude (or its derivative function), aircraft altitude (or its derivative function corresponding to the descent rate), composition of exhalation gas, breathing frequency and blood oxygen saturation.

the continuous supply mode is a first continuous supply mode and the at least one parameter is at least one first parameter, and the method comprises adjusting the flow of breathing gas at a first flow in the first continuous supply mode, and adjusting the flow of breathing gas at a second flow in a second continuous supply mode, the second flow being higher or equal to the first flow;

the continuous supply mode is a first continuous supply mode and the at least one parameter is at least one first parameter, and the method comprises adjusting the flow of breathing gas between a low flow and a high flow in the first continuous supply mode, and setting the flow of breathing gas at a predetermined (maximum) flow in a second continuous supply mode, the predetermined flow being higher or equal to the high flow;

switching between the first continuous supply mode and the second continuous supply mode based on a second parameter;

the second parameter includes presence of toxic gas in ambient gas;

not supplying the reservoir with breathing gas until ambient air pressure is lower than a depressurisation threshold, and automatically supplying the reservoir with a continuous flow of breathing gas when ambient air pressure is lower than (or equal to) the depressurisation threshold;

simultaneously supplying a plurality of reservoirs, each associated with one face mask.

Other objects, features, and advantages of the present invention will be apparent to persons skilled in the art with reference to the remaining text and drawings of this application.

DETAILED DESCRIPTION

Figure 1:
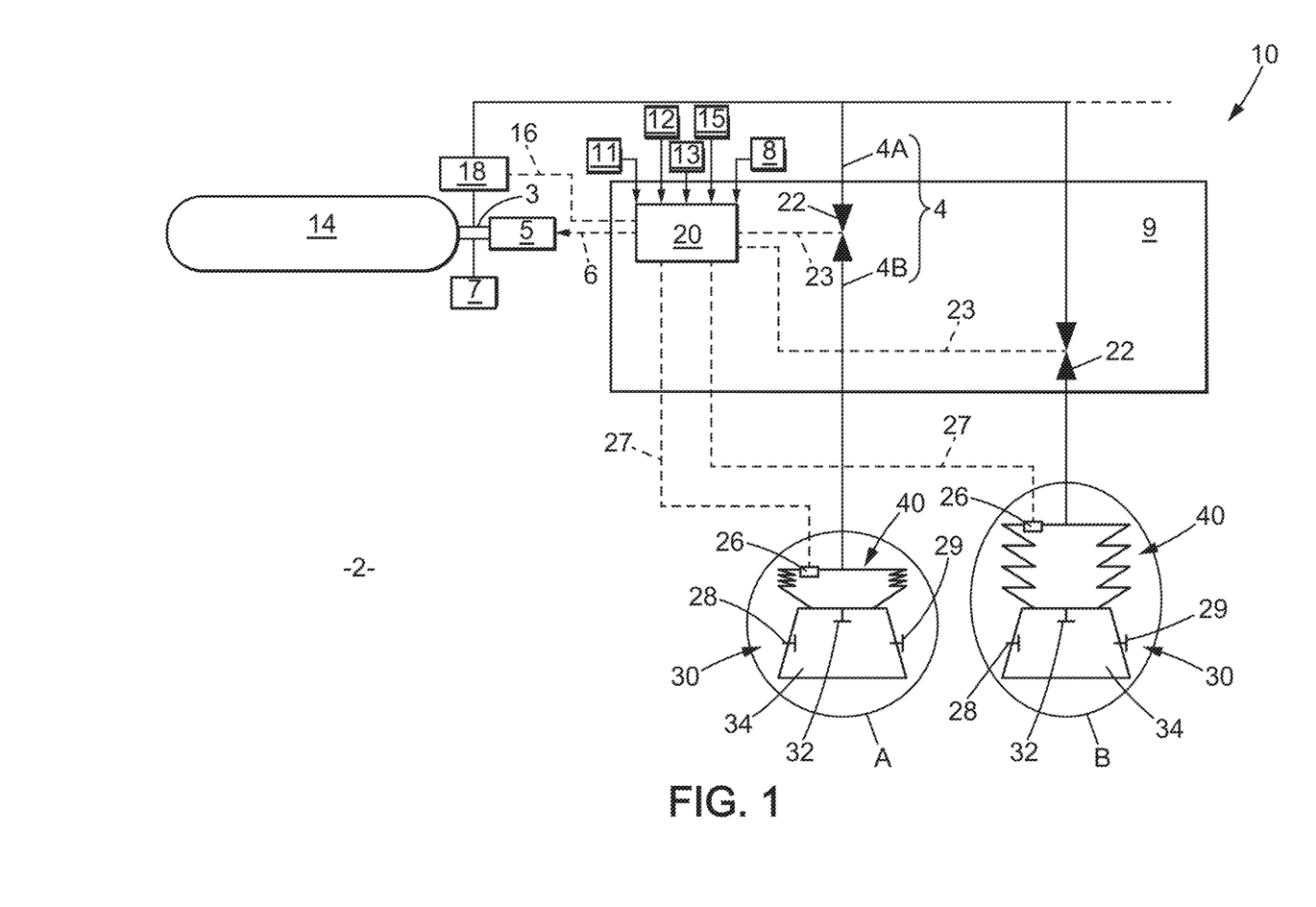
FIG. 1 is a schematized view of a first embodiment of a system comprising a plurality of face masks and associated reservoirs according to the invention.

FIG. 1 depicts a system 10 for delivering complementary breathing gas (oxygen) to passengers on-board an aircraft. The system 10 is implemented in an aircraft, more accurately in the cabin of an aircraft. The cabin of the aircraft is pressurised so that cabin ambient air 2 is pressurised and include a standard rate of oxygen (about 21%). The system 10 is intended to deliver complementary breathing gas (oxygen) to passengers on-board an aircraft in case of depressurisation due to the failure of pressurisation device or an uncontrolled leak between the cabin and outside, and/or when toxic gases, in particular fumes, are present in the cabin ambient air 2.

The system 10 comprises a source of breathing gas 14, a plurality of delivery valve 22, a plurality (two are illustrated) of face masks 30 for passengers (users), a plurality of reservoirs 40, a plurality of sensors 26, a controller 20 and tubing 4.

Tubing 4 includes first tubing 4A and second tubing 4B.

The delivery valves 22 are disposed between the source of breathing gas 14 and the reservoir 40 The delivery valves 22 are connected to the source of breathing gas 14 by first tubing 4A, preferably rigid tubing, which supplies the delivery valves 22 with breathing gas.

Each reservoir 40 is associated with one of the face masks 30. The reservoir 40 is disposed between the delivery valve 22 and the face mask 30. The reservoirs 40 are connected to the delivery valves 22 by second tubing 4B, preferably flexible tubing, Each face mask 30 has a cavity 34 in which the user (passenger) is intended to inhale and exhale. In the embodiment illustrated, the face mask 30 has a cup-shape internally defining the cavity 34. The face mask 30 comprises at least one inlet valve 32 intended to reduce the risk of ingression of water, ice or dust into the reservoir 40 while enabling the face mask 30 to be supplied with breathing gas when the pressure in the cavity 34 is lightly lower than the pressure in the reservoir 40. Each mask 30 further comprises an ambient valve 28 which enables each passenger to breath cabin ambient air 2 diluting the breathing gas (when the reservoir 40 is empty). Each face mask 30 also comprises an exhalation valve 29 to enable gas within the face mask 30 to exhaust the face mask 30 when the passenger exhales. The ambient valve 28, the exhalation valve 29 and the inlet valve 32 are preferably check valves.

Each sensor 26 is associated with one of the reservoirs 40 and is configured to sense the filling in the reservoir 40. The information relating to the filling state sensed by the sensors 26 is transmitted from the sensors 26 to the controller 20 as schematically represented by dash lines 27 in FIG. 1.

In the embodiment illustrated, the controller 20 is configured to control the delivery valves 22 in a first (main) supply mode to provide a continuous flow of breathing gas to the reservoir 40 through second tubing 4B, in order to supply aircraft passengers with breathing gas when the cabin altitude (pressure in the cabin) is sufficiently high as to induce hypoxia. The controller 20 is also configured to interrupt the continuous flow of breathing gas when the filing state of the reservoir sensed by the sensor 26 is at a filling threshold. Moreover, the controller 20 is also preferably configured to control the delivery valve 22 in a second (emergency) supply mode in case of toxic gas in cabin ambient air 2 is sensed by a fume sensor 8.

Dash lines 23 schematically represent the connection between the controller 20 and the delivery valves 20 which may be wires or any appropriate known connection, such as radio, Bluetooth and wifi for instance.

Preferably, the delivery valves 22 reside on one or more control boards 9. The controller 20 may be present on the control board 9.

The system 10 additionally may include manifold or housing 3 in gaseous communication with the source of breathing gas 14. Housing 3 may, if appropriate, have a relief valve 7 or other means of venting gas if the pressure thereof exceeds a particular threshold. Downstream of housing 3 may be HP reducer and/or a regulator 18, which functions to decrease or otherwise regulate the pressure of the oxygen from housing 3 before the oxygen flows to passengers of an aircraft or other vehicle. The HP reducer and/or the regulator 18 preferably reduces the absolute pressure between 1.5 bar and 6 bar.

The regulator 18 may be controlled by the controller 20 to adjust the absolute pressure downstream the regulator 18. The regulator 18 may be electrically controlled by wire 16 or or any appropriate known connection, such as radio, Bluetooth and wifi for instance. A more detailed description of such a real-time controlled regulator may be found in document WO 2015/128690A1.

Also, included as part of the system 10 may be an initiator 5. The source of breathing gas 14 is initially sealed. The initiator 5 may comprise any suitable mechanism for establishing gas flow from the source of breathing gas 14 to housing 3. One possible version of initiator 5 may utilize at least one SMA (Shape Memory Alloy) whose change in shape upon heating may cause a seal of the source of breathing gas 14 to be punctured. The initiator 5 is connected to the controller 20 by an electrical wire 6, so that the initiator 5 is controlled by the controller 20.

The system 10 further comprises at least one of a cabin altitude sensor 11, an aircraft altitude sensor 12, an exhalation gas sensor 13 and a blood oxygen saturation sensor 15 connected to the controller 20. The cabin altitude sensor 11 senses the pressure within the cabin 2 (also referred to as cabin altitude). The aircraft altitude sensor 12 senses the pressure outside the cabin (outside the aircraft, also referred to as aircraft altitude). The exhalation gas sensor 13 senses the composition of at least one gas (in particular oxygen and/or carbon dioxide) in the exhalation gas exhaled by the passenger (user). The blood oxygen saturation sensor 15 senses oxygen saturation in the blood of the passenger.

Figure 2:
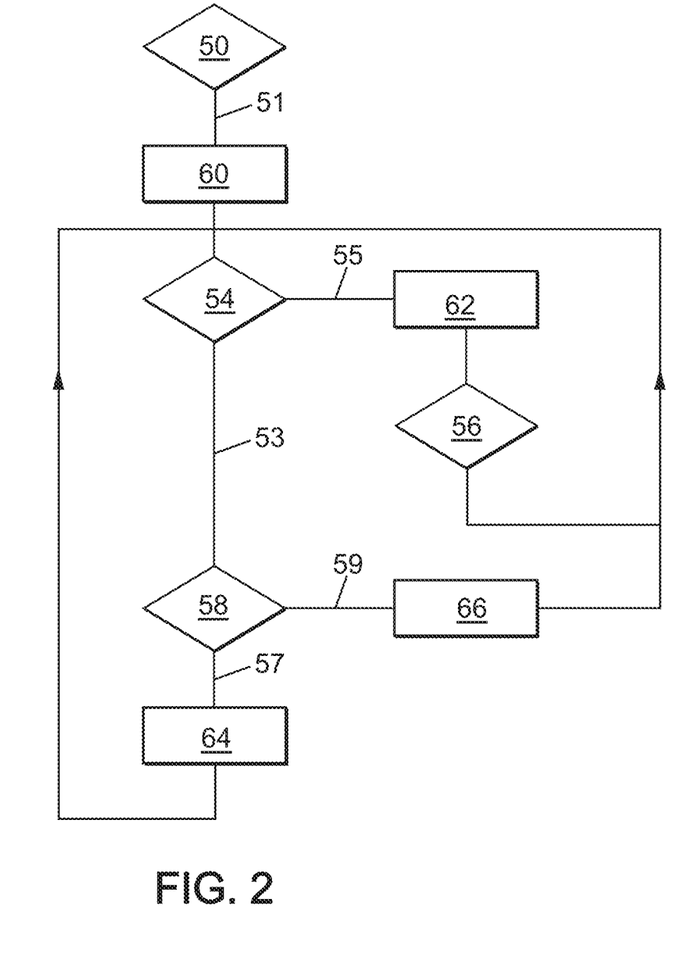
FIG. 2 is a flow chart illustrating activities involved in operation according to the present invention.

FIG. 2 depicts a flow chart identifying activities consistent with an exemplary system 10 of the present invention. In this version, loss of cabin pressurization at high altitude (block 50) activates flow of complementary oxygen to persons on-board the aircraft (block 60). Branch 51 corresponds to condition of detection of loss cabin pressurization fulfilled. Depressurization of the aircraft may be sensed in any suitable manner, either centrally for all passengers or more locally for a particular passenger or group of passengers, in particular with the cabin altitude sensor 11. In such a case, the controller 20 activates the initiator 5. More generally, flow activation may be controlled by one or more computerized controllers 20 (see FIG. 1) to which the sensed depressurization signals are communicated, and oxygen may be supplied by any suitable source 14 such as, but not limited to, one or more oxygen bottles.

Controller 20 additionally is configured to receive information relating to the fullness of buffer or reservoir 40 associated with each particular face mask 30 (block 54) from the sensor 26. If reservoir 40 is full of oxygen (branch 55), controller 20 signals delivery valve (or delivery valve) 22 to close (block 62). When delivery valve 22 closes, oxygen no longer flows from source 14 to (full) reservoir 40, hence avoiding valuable oxygen being shunted to the cabin environment 2 and thereby wasted. By contrast, if reservoir 40 is not full of oxygen (branch 53), controller 20 causes or permits delivery valve 22 to remain open, thus allowing oxygen to flow from source 14 to reservoir 40 (block 64) in the first supply mode. Such oxygen flow may occur at any desired rate, typically—but not necessarily—as functions of the altitude and descent rate of the aircraft. More generally, the flow of oxygen is adjusted between a low flow (about 3 litres per minute) and a high flow (about 40 litres per minute) depending on the aircraft altitude (and its derivative function the descent rate), the cabin altitude, the composition of the exhalation gas of the user, the breathing frequency of the user and the blood oxygen saturation of the user.

FIG. 1 illustrates the exemplary system 10 as used for at least two passengers. Beneficially, each face mask 30 will include the reservoir 40 attached or otherwise capable of communicating breathing gas to the face mask 30. Likewise beneficially, each reservoir 40 will incorporate the sensor 26 and be connected in fluid communication with source of breathing gas 14 via the delivery valve 22 and tubing 4. Stated differently, each mask 30 of a presently-preferred system 10 is associated with a reservoir 40 and a delivery valve 22, with the system 10 being scalable for multiple masks 30 within an aircraft 2. Each mask 30 also could be associated with a separate controller 20 and oxygen source 14, although advantageously the depicted controller 20 and source 14 are not dedicated to a single mask 30 but rather are associated with multiple masks 30 within the aircraft.

Reservoir 40 may be of any desired size, shape, and construction. It may, for example, take the form of a bag similar to that described in the Cannon patent. As an alternative example, reservoir 40 may be a bellows-type accumulator (see FIG. 3A, 3B). Some versions of reservoir 40 may (but need not necessarily) be sized so as to store a quantity of oxygen sufficient to allow recovery of even a deeply-desaturated passenger.

In some versions of the invention, sensor 26 is configured to sense whether its associated reservoir 40 is, or is not, full of oxygen. For these versions, therefore, sensor 26 need only provide a binary output (FULL/NOT FULL) to controller 20. In other versions of the invention, sensor 26 may be adapted to provide more precise information respecting reservoir 40—e.g. that reservoir 40 is 86% full of oxygen, or within a range of 20-40% full of oxygen, etc. This more-precise information as provided to controller 20 could allow determination of certain breathing characteristics of the passenger such as breathing rate or inhalation speed, which in turn could be used to allow inferences as to whether the passenger is hyperventilating or unconscious, as examples, in order to adjust the flow of breathing gas provided to the user. Information supplied by sensors 26 additionally may be relayed to the aircraft crew for determination of the number of passengers breathing through masks 30, which could be compared against flight manifests as a check as to whether any passengers seem not to be using masks 30.

Delivery valve 22 may alone, or together with other components, control oxygen delivery in any suitable manner. Exemplary delivery controls include pulse-width modulation (PWM) of oxygen flow, variable valves, or variable upstream pressures through orifices (for instance controlling pressure downstream the pressure regulator 18). Persons skilled in the art will, of course, recognize that other delivery manners may be used—including some that might not require use of delivery valve 22.

When the delivery valve 22 is an on/off valve controlled in pulse-width modulation or the like, the delivery 22 may be controlled by the controller 20 both in order to fulfil two functions, adjusting the continuous flow of breathing gas and to interrupt the flow of breathing gas when the filling threshold of the reservoir 40 (preferably the reservoir 40 is dull) is reached. And, the continuous flow of breathing gas supplying each reservoir 40 may be individually adjusted based on characteristics sensed depending on the user (for instance, blood saturation or breathing rate, inhalation speed . . . ).

In a variant embodiment, the delivery valve 22 may be controlled by the controller 20 in order to fulfil the function of interrupting the flow of breathing gas when the filling threshold of the reservoir 40 (preferably the reservoir 40 is full) is reached whereas the controller 20 controls the regulator 18 to adjust the continuous flow. The continuous flow may be adjusted by adjusting the pressure downstream the regulator 18. In such a case, the regulator 18 is a real-time controlled regulator and a calibrated is preferably provided in tubing 4 or in the delivery valve 22. When the system 10 comprises only one regulator 18, the continuous flow of breathing gas is adjusted at the same value for all the face masks 30 supplied by the regulator 18. But, the continuous flow can be independently interrupted by the delivery valve 22 for each face mask 30.

In essence, some of the present systems 10 allow each reservoir 40 to accumulate an amount of oxygen greater than would be present should the minimum oxygen delivery per unit time be employed (as per federal U.S. regulations). As an example, at least one version of reservoir 40 may accumulate one liter of oxygen. Thus, even if a passenger's blood has become materially desaturated of oxygen, ample oxygen may be present in reservoir 40 for direct inhalation by the passenger in order to permit him or her to recover from the desaturation.

Sensors 26 may be of any suitable type. Examples of possible sensors 26 include micro-switches, internal pressure sensors, laser distance sensors, lanyards (see FIG. 3A, 3B) which may become taut so as to change the state of an object, etc. A sensor 26 may be sampled at any desired time intervals in order to obtain fullness information respecting reservoir 40 as a function of time.

If sensor 26 is configured to provide only binary outlet (FULL/NOT FULL), hysteresis could be included in the detection circuitry to present nuisance (i.e. small, frequent) top-ups of reservoir 40 due to events such as signal noise, small leaks, or otherwise. In particular, as depicted in the flow chart of FIG. 2, the continuous flow is not resumed (block 64) just when the filling reservoir sensed by the sensor 26 is below a first threshold of filling which triggers the closing of the delivery valve 22 (block 62). The filling reservoir sensed by the sensor 26 must be lower than a second threshold (block 56) before resuming the continuous flow (block 64).

Controller 20 could be programmed to query sensor 26, or sensor 26 could be configured to communicate information to controller 20 at fixed or variable intervals even if not having received a query from the controller 20. Any communication described herein that may be accomplished electronically may be performed either wirelessly or with wires.

Finally, systems of the invention may operate in a second (emergency) supply mode (block 66), preferably a smoke-prevention mode in the illustrated. If smoke, or more generally toxic gas in the cabin ambient air 2 is detected (block 58) by the fume sensor 8, the controller 20 controls the delivery valve 22 (or in variant the regulator 18) in the second (emergency) supply mode (block 66) along branch 59, instead of the first (main) supply mode (block 64) along branch 57. In such second (emergency) supply mode the oxygen delivery rate would not necessarily be dependent on aircraft altitude and descent rate, but instead could be chosen so as to maintain each reservoir 40 as full at all times. So, the oxygen delivery rate in the second (emergency) supply mode is maximum and preferably higher or equal to the high flow in the first (main) supply mode (for instance, about 40 litres per minute). This approach would allow the reservoir 40 to accumulate sufficient oxygen to accommodate the entire breathing cycle of the passenger, even at peak demand, so as to prevent the passenger from breathing any smoky cabin air.

In case, the controller 20 controls the delivery valve 22 to adjust the continuous flow of breathing gas supplying the associated reservoir 40, preferably in the second continuous mode the delivery valve 22 stays fully open. And, in the first continuous mode, if the delivery valve 22 is an/off valve, the rate during which the delivery valve 22 is open may be adjusted in order to adjust the continuous flow of breathing gas supplying the associated reservoir 40 between the low flow and the high flow.

In variant, if the controller 20 controls the regulator 18 in order to adjust the continuous flow of breathing gas supplying the associated reservoir 40, in the first continuous mode, pressure downstream regulator may vary between a low absolute pressure (for instance 1.5 bar) and a high pressure (for instance 6 bar), and in the second mode the regulator 18 may be controlled to set the high pressure below the regulator 18 in tubing 4.

Figure 3A:
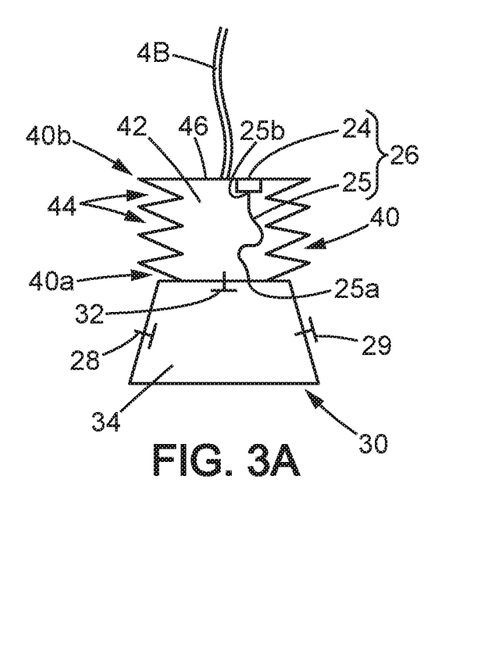
FIG. 3A is a view at larger scale of a portion referenced A in FIG. 1, representing one face mask with the associated reservoir in an empty state.
Figure 3B:
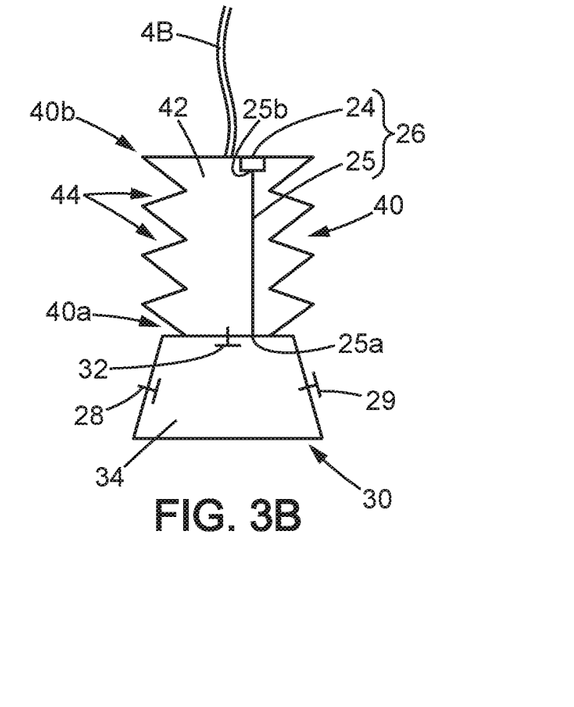
FIG. 3B is a view at larger scale of a portion referenced B in FIG. 1, representing one face mask with the associated reservoir in a full state.

FIG. 3A and FIG. 3B illustrate a bellows-type accumulator forming reservoir 40. Such a reservoir may occupy a smaller space compared with conventional bags yet have a similar volumetric capacity.

The reservoir 40 extends between a first longitudinal end 40*a* and a second longitudinal end 40*b* and has an internal volume 42.

The reservoir 40 is connected to the face mask 30 through the first longitudinal end 40*a*. The reservoir 40 is connected to the second tubing 4B through the second longitudinal end 40*b*. Connection to the second tubing 4B located near the second longitudinal end 40*b* may allow second tubing 4B to facilitate unfurling of reservoir 40 as it inflates in use. In either situation, second tubing 4B preferably attaches elsewhere than at an end of a reservoir bag distal from the face mask (as occurs conventionally).

In a variant the reservoir could be connected to the second tubing 4B near the first longitudinal end 40*a*. Connection located near the first longitudinal end 40*a* be beneficial at least in that second tubing 4B could be attached directly to the inlet valve 32 at a rear of face mask 30 and thus would not affect inflation and deflation of the reservoir 40. In particular, the reservoir 40 would not need to counteract the weight of second tubing 4B when it deflates. Also, when face mask 30 and the reservoir 40 are stowed, second tubing 4B would not pull on reservoir 40 and thus disturb its positioning and arrangement.

As depicted in FIGS. 3A, 3B, the exemplary bellows of FIGS. 3A, 3B contains four pleats 44 and may have circular cross-section. Reservoir 40 may be formed differently than as shown, however; if a bellows, reservoir 40 additionally may have more or fewer than four pleats 44 and need not necessarily have circular cross-section.

In FIG. 3A, reservoir 40 is deflated, consistent with its status when stowed. Reservoir 40 is not positioned within mask 14 and hence should not impede donning of the face mask 30 by a passenger. The configuration of reservoir 40 allows easy inflation of the bellows in a volume-efficient design. Stated differently, a bellows-type reservoir 40 creates a relatively large inflated volume 42 for a relatively small two-dimensional footprint.

Presently preferred is that reservoir 40 be made of supple material similar to that of conventional reservoir bags. More robust material may be used instead, however. Alternatively or additionally, reservoir 40 may be reinforced using a plastic backing plate 46 at the second longitudinal end 40b.

Strings or threaded tethers conceivably could be utilized to prevent over-extension or burst of reservoir 40 when pressurization is desired.

Bellows-type reservoirs need not be stored within cups of face masks. They likewise need not be folded—or need not be folded as compactly as are conventional bags, hence reducing any likelihood that the reservoirs will fail to inflate appropriately. Moreover, employing a bellows additionally creates a buffer (reservoir) configured to adapt better to peak instantaneous flow of the dynamic breathing of a passenger (or crewmember).

Reservoir 40 may be made of flexible, relatively thin plastic material, as is conventional. Alternatively, the reservoir 40 may be formed of material sufficient to allow them to be pressurized, generating reduced envelopes as compared to conventional unpressurized bags. Inflation and deflation of the bellows further may furnish to crewmembers better visual indication of the delivery of respiratory gas to and consumption of the gas by passengers.

Otherwise, in the embodiment shown in FIGS. 3A, 3B, the sensor 26 comprises a switch 24 and a lanyard 25. The lanyard (string) 25 has a first lanyard end 25a fixed to the first longitudinal end 40a of the reservoir 40 and a second lanyard end 25b connected to the second longitudinal end 40b of the reservoir 40 through the switch (microswitch) 24.

As the reservoir 40 is in the form of a bellows the extension of the reservoir 40 is roughly linearly proportional to the volume of gas within. When the reservoir 40 is full the lanyard 25 pulls on and activates the switch 24. The FIGS. 3A, 3B demonstrates an extension of the reservoir 40 of bellows-type when filling, but this could also be applied to a radial expansion, in particular of the classic 'bag' type reservoir.

Otherwise, in the embodiments illustrated in FIGS. 3A, 3B, instead of the switch 24 and lanyard 25a, the sensor 26 comprise a laser/reflector system with a pulse and time delay measurement could determine the distance of the reflector from the laser and give an almost continuous scale of 'fullness' of the reservoir as a function of distance. One amongst the laser and the reflector would be fixed near the first longitudinal end 40a, preferably to the face mask 30 and the other to the second longitudinal end 40b, preferably to the backing plate 46.

Figure 4A:
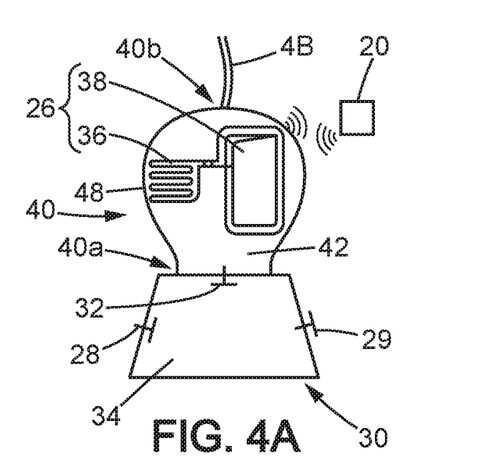
FIG. 4A represents a face mask with an associated reservoir according to a second embodiment, the reservoir being in an empty state.
Figure 4B:
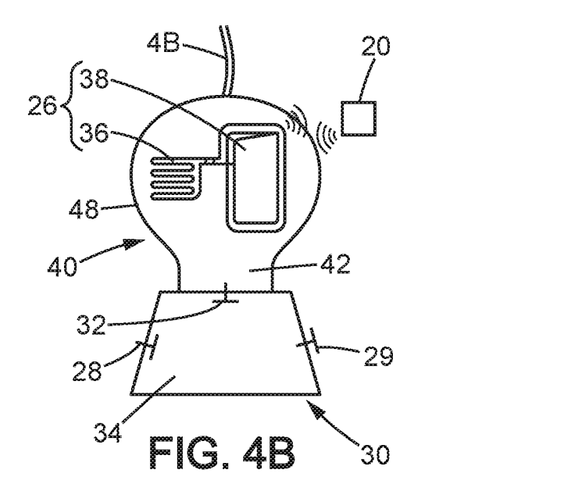
FIG. 4B represents the face mask with the associated reservoir according to the second embodiment, the reservoir being in full state.

FIGS. 4A and 4B illustrate another variant. The reservoir 40 has a flexible bag 48 of classic style. The sensor 26 comprises a strain gauge 36 integrated into the wall of the flexible bag 48. As the bag inflates it stretches slightly, which is detected by the strain gauge 36.

For the detection of the state (filling) of the reservoir 40, as schematically illustrated in FIGS. 4A and 4B the information may be transmitted between the sensor 26 and the controller 20 by electromagnetic wave.

The information between the sensors 26 and the controller 20 may be transmitted by a RFID module 38 that changes its response based on the filling state of the reservoir 40. That means the RFID module 38 is used to power and read the sensor 26. This RFID antenna of the RFID module 38 is preferably encapsulated in the wall of the reservoir 40 or the face mask 30. The transmitter of the RFID module 38 is connected to the controller 20.

Figure 5A:
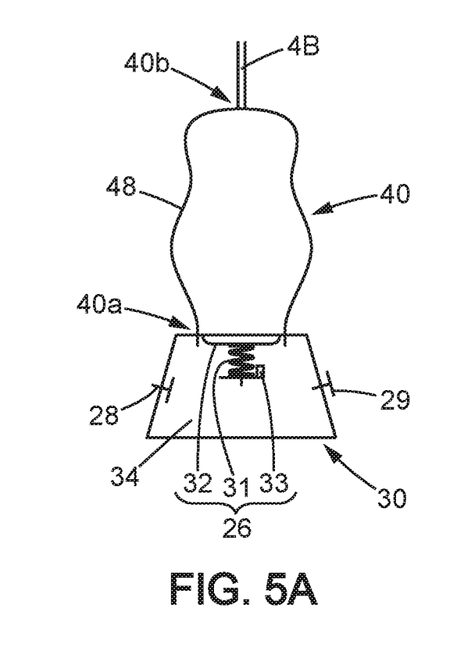
FIG. 5A represents a face mask with an associated reservoir according to a third embodiment, the reservoir being in an empty state.
Figure 5B:
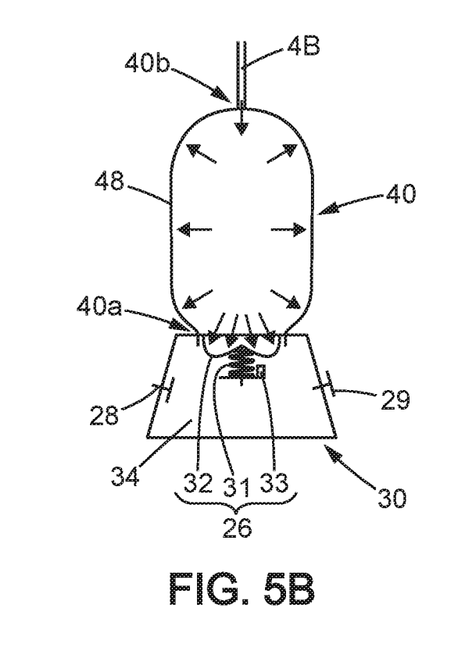
FIG. 5B represents the face mask with the associated reservoir according to the third embodiment, the reservoir being in full state.
Figure 5C:
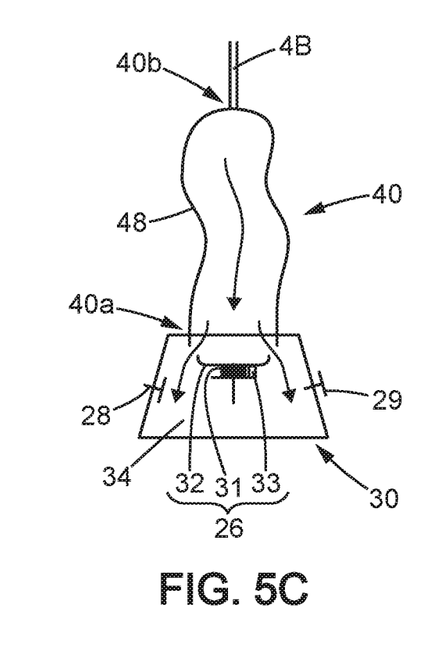
FIG. 5C represents the face mask with the associated according to the third embodiment, the reservoir draining in the face mask.

In the embodiment shown in FIGS. 4A, 4B, as well in the embodiment illustrated in FIGS. 3A, 3B, or in the embodiment illustrated in FIGS. 5A, 5B, in variant the information between sensors 26 and the controller 20 may be transmitted by wire, preferably which directly links the sensors 26 to the controller 20, the wires being preferably encapsulated in the wall of the reservoir and the tubing 4.

In another variant, the information between sensors 26 and the controller 20 may be transmitted by waves such as radio, Bluetooth, WiFi powered by a battery.

FIGS. 5A and 5B illustrate another variant. The sensor 26 comprises inlet valve 32 and a motion detector 33. The inlet valve 32 is of check valve type urged by a spring 31 in closed position. The inlet valve 32 is preferably of soft silicon. As the reservoir bag 40 inflates to the maximum then a slight positive pressure is exerted on the valve, causing the soft silicon to deform. This deformation could be detected by a Hall Effect sensor, an optical sensor or otherwise.

In order to detect the filling state of the reservoirs 40 in another variant the sensor 26 may include sensors to measure the flow from the tubing 4B entering within the reservoir 40 and the flow exiting the reservoir toward the face mask 30 (through the inlet valve 32), integrating the difference along the time. Indeed, the variation of the volume of gas inside the reservoir is equal to the volume entered minus the volume exited. Such flow sensors may be spirometer, venture meter, orifice plate, or any other suitable technology.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The entire contents of the Cannon patent are incorporated herein by this reference. Further, although applicant has used the term "aircraft" herein, persons skilled in the relevant field will recognize that the present invention may be employed in other vehicles or in stationary objects such as (but not limited to) buildings. Finally, references to "oxygen" herein need not necessarily refer to gases containing 100% oxygen, but may also refer to other breathing gases containing at least some oxygen.

What is claimed is:

1. A system for delivering breathing gas to passengers on-board an aircraft, comprising:
   a source of breathing gas,
   a face mask for passengers,
   a reservoir associated with the face mask,
   a delivery valve each connected with the face mask, the delivery valve being disposed between the source of breathing gas and the reservoir, the reservoir being disposed between the delivery valve and the face mask,
   a sensor associated with the reservoir and configured to produce an electrical signal based upon a filling of the reservoir,
   a controller configured to control the delivery valve in a continuous supply mode to provide a continuous flow of breathing gas to the reservoir and to interrupt the continuous flow of breathing gas when the filling sensed by the sensor is a filling threshold, and
   wherein the face mask is positioned downstream from the source of breathing gas, and the face mask is downstream from the reservoir, such that the breathing gas that exits the source of breathing gas and the delivery valve would enter the reservoir before the breathing gas enters the face mask.

2. The system according to claim 1 wherein:
   the continuous supply mode is a first continuous supply mode,
   the controller is configured to adjust the flow of breathing gas in a second continuous supply mode higher than in the first continuous supply mode.

3. The system according to claim 2 wherein the controller is configured to switch between the first continuous supply mode and the second continuous supply mode based on a second parameter, the second parameter including presence of toxic gas and/or fumes in ambient gas.

4. The system according to claim 2 wherein:
   the controller is configured to adjust the flow of breathing gas in the first continuous supply mode between a low flow and a high flow, and
   the controller is configured to adjust the flow of breathing gas in the second continuous supply mode higher or equal to the high flow.

5. The system according to claim 2 wherein the controller is configured to set the flow of breathing gas at a predetermined flow in the second continuous supply mode.

6. The system according to claim 2 wherein the delivery valve is of on/off valve and the controller is configured to control the delivery valve in Pulse Modulation mode in the first continuous supply mode, and the controller is configured to maintain the delivery valve open in the second continuous supply mode.

7. The system according to claim 2 wherein the system further comprises a regulator configured to be controlled by the controller to adjust the flow of breathing gas in the first continuous supply mode and in the second continuous supply mode.

8. The system according to claim 1 wherein the source of breathing gas is provided in a deactivated state and the system is configured to automatically activate the source of breathing gas in case of depressurisation.

9. The system according to claim 1 wherein:
   the filling threshold is a first filling threshold,
   the sensor is configured to sense the filling of the reservoir at a second filling threshold lower than the first filling threshold, and
   the controller is configured to resume the continuous flow when the filling sensed by the sensor is the second filling threshold.

10. The system according to claim 9 wherein the second filling threshold is at least 3% below the first filling threshold.

11. The system according to claim 1 wherein the controller is configured to adjust the flow of breathing gas at several non-null values in the continuous supply mode based on at least one first parameter.

12. The system according to claim 11 wherein the at least one first parameter is selected from the group consisting of cabin altitude, aircraft altitude, composition of exhalation gas, breathing frequency and blood oxygen saturation.

13. The system according to claim 11 wherein:
   the sensor is configured to sense at least two different values of reservoir filling, and
   the controller is configured to determine at least first parameter based on the values of reservoir filling sensed by the sensor.

14. The system according to claim 1 wherein the sensor is configured to send a binary signal based on the filling threshold of the reservoir.

15. The system according to claim 1 wherein the sensor is configured to sense at least two different values of reservoir filling.

16. The sensor according to claim 1 wherein the filling threshold is fullness of the reservoir.

17. The system according to claim 1 wherein the reservoir is a reservoir bag of bellows bag.

18. The system according to claim 17 wherein:
   the reservoir extends between a first longitudinal end and a second longitudinal end, and
   the reservoir comprises several annular pleats between the first longitudinal end and the second longitudinal end.

19. The system according to claim 18 wherein:
   the reservoir is connected to the face mask through the first longitudinal end, and
   the reservoir comprises a backing plate at the second longitudinal end.

20. The system according to claim 17, wherein the sensor comprises a switch and a lanyard, and the lanyard has a first lanyard end fixed to the first longitudinal end of the reservoir and a second lanyard end connected to the second longitudinal end of the reservoir through the switch.

21. The system according to claim 1 wherein:
   the reservoir comprises a flexible reservoir bag, and
   the sensor comprises a strain gauge fixed on the reservoir.

22. The system according to claim 1 wherein:
   the face mask comprises an inlet valve between the reservoir and a breathing cavity of the face mask, the inlet valve is a check valve.

23. The system according to claim 1 wherein:
   the face mask comprises an inlet valve between the reservoir and a breathing cavity of the face mask, the inlet valve is a check valve,
   the inlet valve is configured to progressively move from a closed position to an open position during the filling of the reservoir, and the inlet valve stays closed between the closed position and an intermediate position, and
   the sensor is configured to detect the intermediate position.

24. The system according to claim 1 wherein:
   the system comprises a RFID module connected to the sensor, the RFID module is configured to power and read the sensor, and the RFID module is configured to communicate with the controller.

25. The system according to claim 1 wherein the system comprises:

wherein the face mask is part of a plurality of face masks, wherein the reservoir is part of a plurality of reservoirs, each reservoir of the plurality of reservoirs being associated with each face mask of the plurality of face masks, wherein the sensor is part of a plurality of sensors, each sensor of the plurality of sensors being associated with each reservoir of the plurality of reservoirs and configured to sense the filling threshold in the respective reservoir, and the controller is configured to control the continuous flow of breathing gas from the source to each reservoir of the plurality of reservoirs and to interrupt the continuous flow of breathing gas to the respective reservoir whose associated sensor senses the filling threshold in the respective reservoir.

26. A method for delivering breathing gas to passengers on-board an aircraft, comprising:

providing the system of claim 1, supplying the reservoir associated with the face mask with the continuous flow of breathing gas, sensing filling of the reservoir via the sensor, interrupting the continuous flow of breathing gas when the filling threshold is reached.

27. The method according to claim 26 wherein the filling threshold is a first filling threshold and the method comprises:

resuming the continuous flow when the reservoir filling decreases to a second filling threshold.

28. The method according to claim 27 wherein the second filling threshold is at least 3% below the first filling threshold.

29. The method according to claim 26 wherein the filling threshold is fullness of the reservoir.

30. The method according to claim 26 comprising:

adjusting the flow of breathing gas at several non-null values in the continuous supply mode based on at least one parameter selected from the group consisting of cabin altitude, aircraft altitude, composition of exhalation gas, breathing frequency and blood oxygen saturation.

31. The method according to claim 30 wherein the continuous supply mode is a first continuous supply mode and the at least one parameter is at least one first parameter, and the method comprises:

adjusting the flow of breathing gas at a first flow in the first continuous supply mode, and adjusting the flow of breathing gas at a second flow in a second continuous supply mode, the second flow being higher or equal to the first flow.

32. The method according to claim 31 comprising:

switching between the first continuous supply mode and the second continuous supply mode based on a second parameter.

33. The method according to claim 32, wherein the second parameter includes presence of toxic gas in ambient gas.

34. The method according to claim 30 wherein the continuous supply mode is a first continuous supply mode and the at least one parameter is at least one first parameter, and the method comprises:

adjusting the flow of breathing gas between a low flow and a high flow in the first continuous supply mode, and setting the flow of breathing gas at a predetermined flow in a second continuous supply mode, the predetermined flow being higher or equal to the high flow.

35. The method according to claim 26 comprising:

not supplying the reservoir with breathing gas until ambient air pressure is lower than a depressurisation threshold, and automatically supplying the reservoir with a continuous flow of breathing gas when ambient air pressure is lower than the depressurisation threshold.

* * * * *